(12) United States Patent
Tseng

(10) Patent No.: US 8,248,258 B2
(45) Date of Patent: Aug. 21, 2012

(54) WAKEUP DEVICE DETECTING VOLTAGE VARIATION IN STANDBY MODE

(75) Inventor: Ching-Hung Tseng, Hsinchu (TW)

(73) Assignee: Tritan Technology Inc., Hsinchu (TW)

( * ) Notice: Subject to any disclaimer, the term of this patent is extended or adjusted under 35 U.S.C. 154(b) by 285 days.

(21) Appl. No.: 12/727,916

(22) Filed: Mar. 19, 2010

(65) Prior Publication Data

US 2011/0050436 A1  Mar. 3, 2011

(30) Foreign Application Priority Data

Sep. 3, 2009 (TW) ................................ 98216285 U

(51) Int. Cl.
*G08B 21/00* (2006.01)

(52) U.S. Cl. ................. 340/636.15; 340/636.1; 340/541; 324/76.11; 324/76.47; 327/143; 327/544

(58) Field of Classification Search ............. 340/636.15, 340/636.1, 541; 327/143, 198, 544; 324/76.11–157, 324/426–437; 702/63; 320/137–165; 307/112, 307/116

See application file for complete search history.

(56) References Cited

U.S. PATENT DOCUMENTS

| | | | | |
|---|---|---|---|---|
| 4,808,972 A | * | 2/1989 | Nicholls | 340/541 |
| 6,756,700 B2 | * | 6/2004 | Zeng | 307/112 |
| 2003/0173829 A1 | * | 9/2003 | Zeng | 307/116 |

* cited by examiner

*Primary Examiner* — George Bugg
*Assistant Examiner* — Sisay Yacob
(74) *Attorney, Agent, or Firm* — Jackson IPG PLLC

(57) ABSTRACT

A resume device is provided. The device detects voltage variation in standby mode. When a big voltage variation is detected, a resume process is run and a sound is played. Volume of the sound is adjustable and power is maintained within a proper range. Thus, power consumption is saved, efficiency is improved and resume process is enhanced.

9 Claims, 3 Drawing Sheets

WAKEUP DEVICE DETECTING VOLTAGE VARIATION IN STANDBY MODE

TECHNICAL FIELD OF THE DISCLOSURE

The present disclosure relates to a wakeup device; more particularly, relates to saving power consumption, improving efficiency and enhancing resume process with a resume detecting unit.

DESCRIPTION OF THE RELATED ART

Electrical devices using batteries do not always stay running. Usually, they are equipped with a standby/resume device for saving power that they are switched on only when they are used.

As shown in FIG. 3, a general standby/resume device 8 comprises a power supply 81, a power switch 82, a stabilizing capacitor 83, a low voltage reset circuit 84, a microcontroller 85 (MCU) and a resume signal detecting circuit 86. On using the standby/resume device 8, the MCU 85 is stayed in a standby mode when the device 8 is not used. During the period of the standby mode, if the power switch 82 is switched off and switched on again, power is resumed. At this moment, voltage of the MCU 85 is lowered down owing to power loss of the power supply 81; and, then, the following two situations may happen:

(1) Voltage of the power supply 81 may be lower than that of the low voltage reset circuit 84; then, the device 8 is resumed as the MCU 85 is normally run.

(2) Voltage of the power supply 81 may not be lower than that of the low voltage reset circuit 84. If there is no resume signal sent at this situation, the device 8 is not resumed because the MCU 85 is not triggered by resume signal through any input pin although power is on again.

When the power supply 81 is stayed in the standby mode, all circuits consume no power except the resume signal detecting circuit 86. Hence, the resume signal detecting circuit 86 is formed into a voltage discharging path. The power consumed by the discharging path is small to prevent power waste in the standby mode. Therefore, the power supply 81 has a slow discharging velocity. If a voltage is off and on very fast, resume or wakeup may become unavailable. Facilitation of portable devices may be thus seriously affected. Hence, the prior art does not fulfill all users' requests on actual use.

SUMMARY OF THE DISCLOSURE

The main purpose of the present disclosure is to provide a resume detecting unit to save power, improve efficiency and enhancing resume process in a continuous mode or a periodically-resuming mode.

The second purpose of the present disclosure is to provide a resume detecting unit to monitor voltage variation for generating resume signal.

The third purpose of the present disclosure is to provide a resume detecting unit to be used in a device using battery with sound played, where voltage variation is monitored to change sound volume and maintain power within a proper range for prolonging operation period of the battery.

To achieve the above purposes, the present disclosure is a wakeup device detecting voltage variation in standby mode, comprising a power unit supplying power; a switching unit connected with the power unit; a voltage stabilizing unit connected with the switching unit; a low voltage reset unit connected with the switching unit; a micro control unit connected with the switching unit; a resume detecting unit connected with the switching unit; and an output unit connected with the resume detecting unit, where the resume detecting unit comprises a voltage reading unit connected with the switching unit; a playing unit connected with the voltage reading unit; and an amplifying unit connected with the playing unit; where the switching unit controls the power unit with voltage changed; where the voltage reading unit measures a voltage of the power unit to obtain a resume signal according to a variation of the voltage to resume the micro control unit and to output an audio signal with coordination of the playing unit and the amplifying unit; where the output unit receives the audio signal from the amplifying unit and plays a sound with the audio signal; and, where the voltage is monitored to resume according to variation of the voltage and to adjust volume of the sound to maintain the voltage at a certain level. Accordingly, a novel wakeup device detecting voltage variation in standby mode is obtained.

BRIEF DESCRIPTIONS OF THE DRAWINGS

The present disclosure will be better understood from the following detailed descriptions of the preferred embodiments according to the present disclosure, taken in conjunction with the accompanying drawings, in which FIG. 1 is the view showing the first preferred embodiment according to the present disclosure;

DESCRIPTION OF THE PREFERRED EMBODIMENTS

The following descriptions of the preferred embodiments are provided to understand the features and the structures of the present disclosure.

Figure 1:
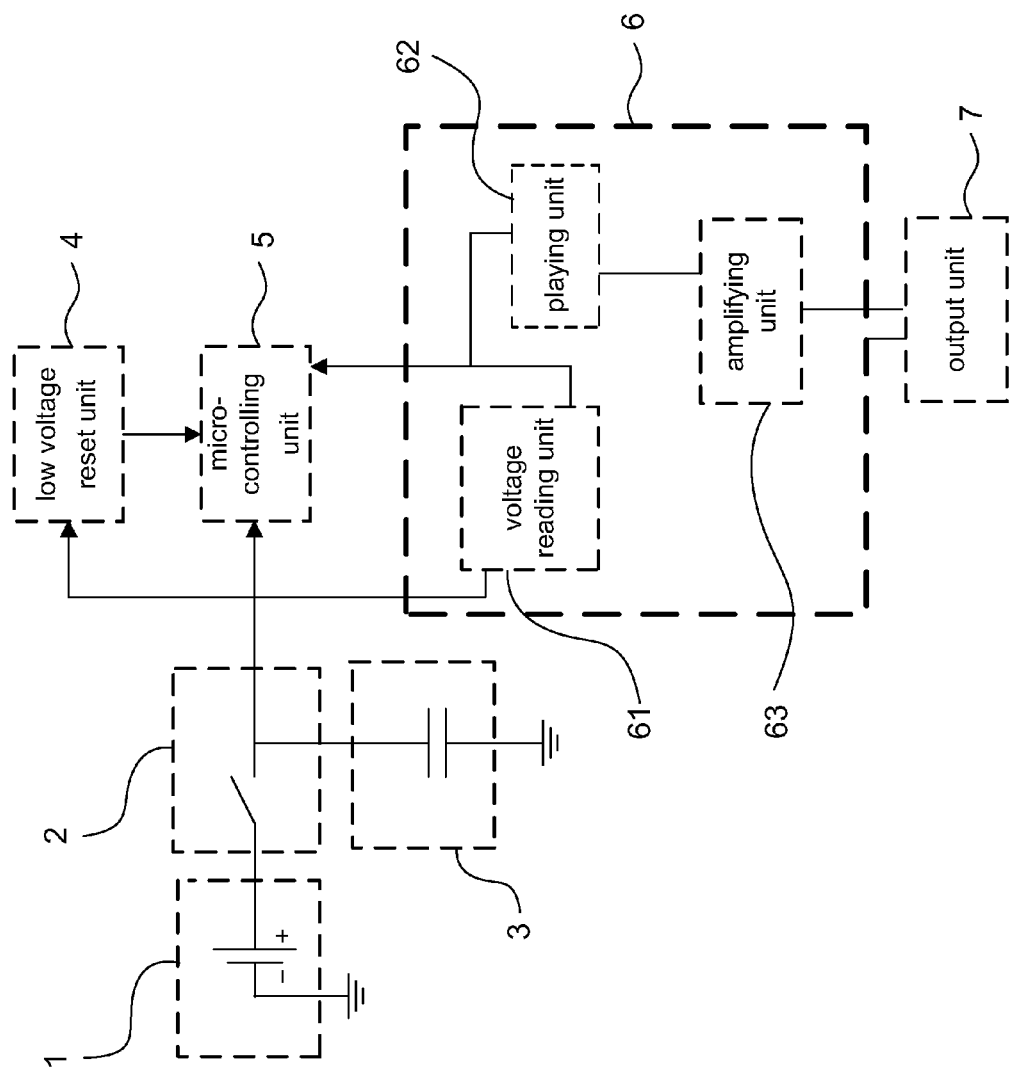
Figure 2:
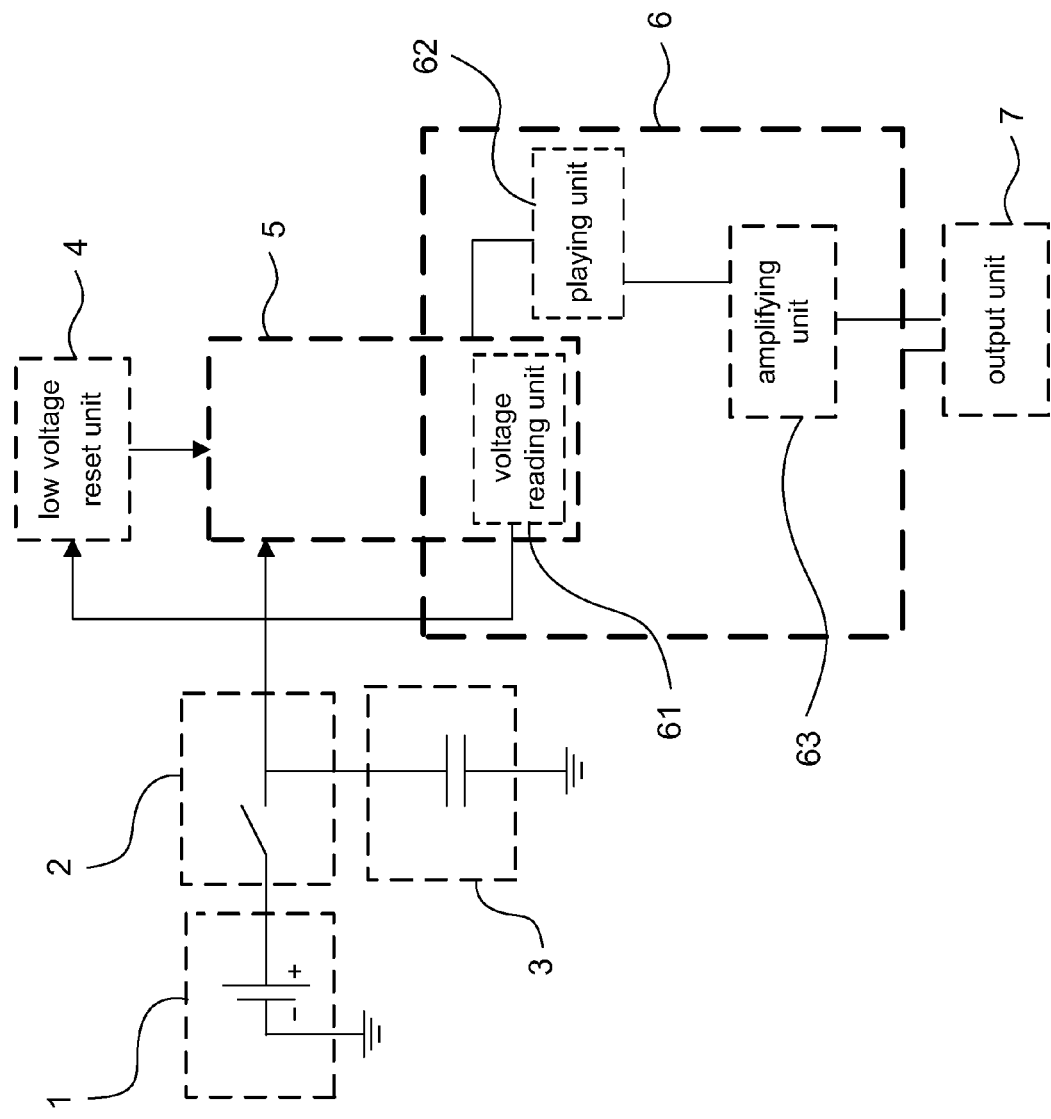
FIG. 2 is the view showing the second preferred embodiment.
Figure 3:
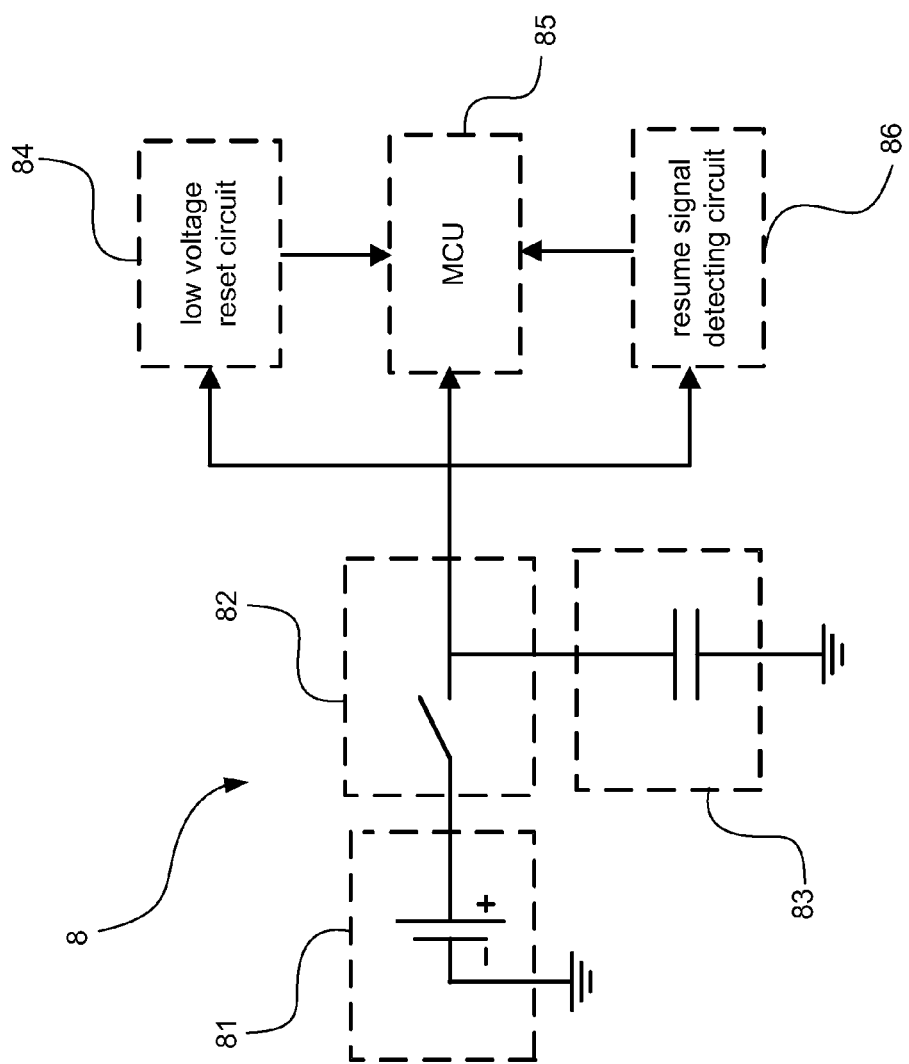
FIG. 3 is the view of the prior art.

Please refer to FIG. 1 and FIG. 2, which are views showing the first and the second preferred embodiments according to the present disclosure. As shown in the figures, the present disclosure is a wakeup device detecting voltage variation in standby mode, comprising a power unit 1, a switching unit 2, a voltage stabilizing unit 3, a low voltage reset unit 4, a micro-controlling unit 5, a resume detecting unit 6 and an output unit 7, where, with the resume detecting unit 6, power consumption is saved, efficiency is improved and resume process is enhanced.

The power unit 1 supplies required power.

The switching unit 2 is connected with the power unit 1. The switching unit controls the power unit 1 with a voltage thus changed.

The voltage stabilizing unit 3 is connected with the switching unit 2 and is a capacitor.

The low voltage reset unit 4 is connected with the switching unit 2.

The micro-controlling unit 4 is connected with the switching unit 2.

The resume detecting unit 6 comprises a voltage reading unit 61 connected with the switching unit 2; a playing unit 62 connected with the voltage reading unit 61; and an amplifying unit 63 connected with the playing unit 62. The voltage changed on controlling the power unit 1 by the switching unit 2 is measured by the voltage reading unit 61. The voltage reading unit 61 is set with a reference voltage source to be compared with the voltage changed. Thus, whether a resume signal is produced or not is decided according to variation of the voltage. Once the resume signal is produced, the micro-controlling unit 5 is waked up to output an audio signal with coordination of the playing unit 62 and the amplifying unit 63. Therein, the voltage reading unit 61 is a hardware, a software or a hardware mixed with software, such as, an analog-to-digital converter, a single chip or field-programmable gate array (FPGA) having an application starting command, or a program in the micro-controlling unit 5. As shown in FIG. 2, the voltage reading unit 61 is a program in the micro-controlling unit 5 and the micro-controlling unit 5 is resumed periodically to run the program.

The output unit 7 is connected with the resume detecting unit 6 and is a speaker. The output unit 7 receives the audio signal from the amplifying unit 63 to play a sound. Thus, a novel wakeup device detecting voltage variation in standby mode is obtained.

On using the present disclosure, the resume device is connected with an electrical device, where the electrical device is entered into a standby mode when it is not used; and, the electrical device is waked up by the resume device through detecting voltage variation. The resume detecting unit 6 is run in a continuous or periodically-resuming mode for detecting the voltage variation of the power unit to save power. When the switching unit 2 is switched off, a voltage of the power unit 1 is lowered down gradually and no resume signal is generated. But, when the switching unit 2 is switched on, the voltage of the power unit 1 is heightened quickly. At this moment, voltage detected by the voltage reading unit 61 has a big change higher than a level preset beforehand; then, a resume signal is generated to wake the micro-controlling unit 5 up for escaping the standby mode and running necessary processes.

The present disclosure can not only be used to wake electrical device up by monitoring voltage variation, but also be used in a device using battery with sound playing. In the device using battery with sound played, the power unit 1 is electrically connected with a battery set (not shown in the figures). With coordination of the playing unit 62 and the amplifying unit 63, an audio signal having a volume-adjusting command is outputted. Thus, through monitoring the voltage variation, volume is adjusted to operate power source within a proper range for preventing abnormal operation owing to voltage too low and for prolonging life of battery.

Thus, on using the present disclosure, a small voltage variation of the power unit 1 can be detected by the resume detecting unit 6; and, on finding a big change in voltage, the micro-controlling unit 5 is waked up to process required operation like playing sound for keeping normal habit of fast switching without increasing discharged current at the cost of standby time.

To sum up, the present disclosure is a wakeup device detecting voltage variation in standby mode, where power consumption is saved, efficiency is improved and resume process is enhanced with a resume detecting unit.

The preferred embodiments herein disclosed are not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A wakeup device detecting voltage variation in standby mode, comprising:
a power unit, said power unit supplying power;
a switching unit, said switching unit being connected with said power unit, wherein said switching unit controls said power unit with voltage changed;
a voltage stabilizing unit, said voltage stabilizing unit being connected with said switching unit;
a low voltage reset unit, said low voltage reset unit being connected with said switching unit;
a micro-controlling unit, said micro control unit being connected with said switching unit; a resume detecting unit, said resume detecting unit comprising a voltage reading unit, said voltage reading unit being connected with said switching unit;
a playing unit, said playing unit being connected with said voltage reading unit; and an amplifying unit, said amplifying unit being connected with said playing unit, wherein said voltage reading unit measures a voltage to obtain a resume signal according to a variation of said voltage to resume said micro control unit and to output an audio signal with coordination of said playing unit and said amplifying unit; and an output unit, said output unit being connected with said resume detecting unit, said output unit receiving said audio signal from said amplifying unit and playing a sound with said audio signal, wherein said voltage is monitored to resume according to variation of said voltage and to adjust volume of said sound to maintain said voltage at a certain level.

2. The wake-up device according to claim 1, wherein said voltage reading unit is selected from a group consisting of an analog-to-digital converter, a hardware, and a program in said micro-controlling unit; and wherein said hardware has an application starting command and is selected from a group consisting of a single chip and a field-programmable gate array (FPGA).

3. The wake-up device according to claim 1, wherein said resume detecting unit is run in a mode selected from a group consisting of a continuous mode and a periodically-resuming mode.

4. The wake-up device according to claim 1, wherein said voltage stabilizing unit is a capacitor.

5. The wake-up device according to claim 1, wherein said output unit is a speaker.

6. The wake-up device according to claim 1, wherein said power unit is a battery set.

7. The wake-up device according to claim 1, wherein said power unit is electrically connected with a battery set.

8. The wake-up device according to claim 1, wherein said voltage reading unit has a reference voltage source to obtain said resume signal by comparison according to said variation of said voltage.

9. The wake-up device according to claim 1, wherein said audio signal has a volume-adjusting command according to said variation of said voltage.

* * * * *